United States Patent [19]

White

[11] Patent Number: 4,735,301
[45] Date of Patent: Apr. 5, 1988

[54] MATERIAL TRANSFER APPARATUS

[76] Inventor: Robert W. White, Rte. 2, Box 17, Maquaketa, Iowa 52060

[21] Appl. No.: 399,114

[22] Filed: Jul. 16, 1982

[51] Int. Cl.⁴ .............................................. B65G 11/02
[52] U.S. Cl. ........................................ 193/34; 406/15
[58] Field of Search ...................... 193/14, 15, 29, 34, 193/46; 52/195, 196; 414/313, 318; 198/417; D34/28; 285/189, 211, 196

[56] References Cited

U.S. PATENT DOCUMENTS

| | | |
|---|---|---|
| 762,940 | 6/1904 | Poignant . |
| 1,318,797 | 10/1919 | Potter . |
| 1,596,552 | 8/1926 | Potter . |
| 1,874,112 | 8/1932 | Miller . |
| 2,418,355 | 4/1947 | Kirsch et al. . |
| 2,557,360 | 6/1951 | Pennella ............................ 285/211 |
| 3,655,245 | 4/1972 | Schumacher . |
| 3,709,345 | 1/1973 | Price . |
| 3,797,625 | 3/1974 | Price ................................... 193/34 |
| 3,870,143 | 3/1975 | Heybourn et al. . |
| 3,931,877 | 1/1976 | Albaugh ............................... 193/15 |
| 4,062,434 | 12/1977 | Price et al. .......................... 193/34 |
| 4,166,524 | 9/1979 | Price et al. .......................... 193/34 |
| 4,260,313 | 4/1981 | Van Dusen ......................... 414/313 |
| 4,281,754 | 8/1981 | Seay ..................................... 193/34 |
| 4,339,024 | 7/1982 | Wollin ................................. 193/34 |
| 4,416,362 | 11/1983 | Kilts et al. . |

Primary Examiner—Sherman D. Basinger
Assistant Examiner—James M. Kannofsky
Attorney, Agent, or Firm—Burd, Bartz & Gutenkauf

[57] ABSTRACT

A tower silo has an upright enclosure providing a first passageway aligned with doorways open to the interior of the silo. A chute secured to the side of the enclosure has a second passageway for carrying material to the base of the silo. A reverse S-shaped housing extends through an open doorway into the first passageway. The housing has a passage, an inlet end mounted on the silo wall and an exit end mounted on a frame secured to the enclosure and surrounding an opening in the enclosure. The exit end is normally disposed relative to the inlet end to direct material moving through the housing passage into the second passage.

18 Claims, 3 Drawing Sheets

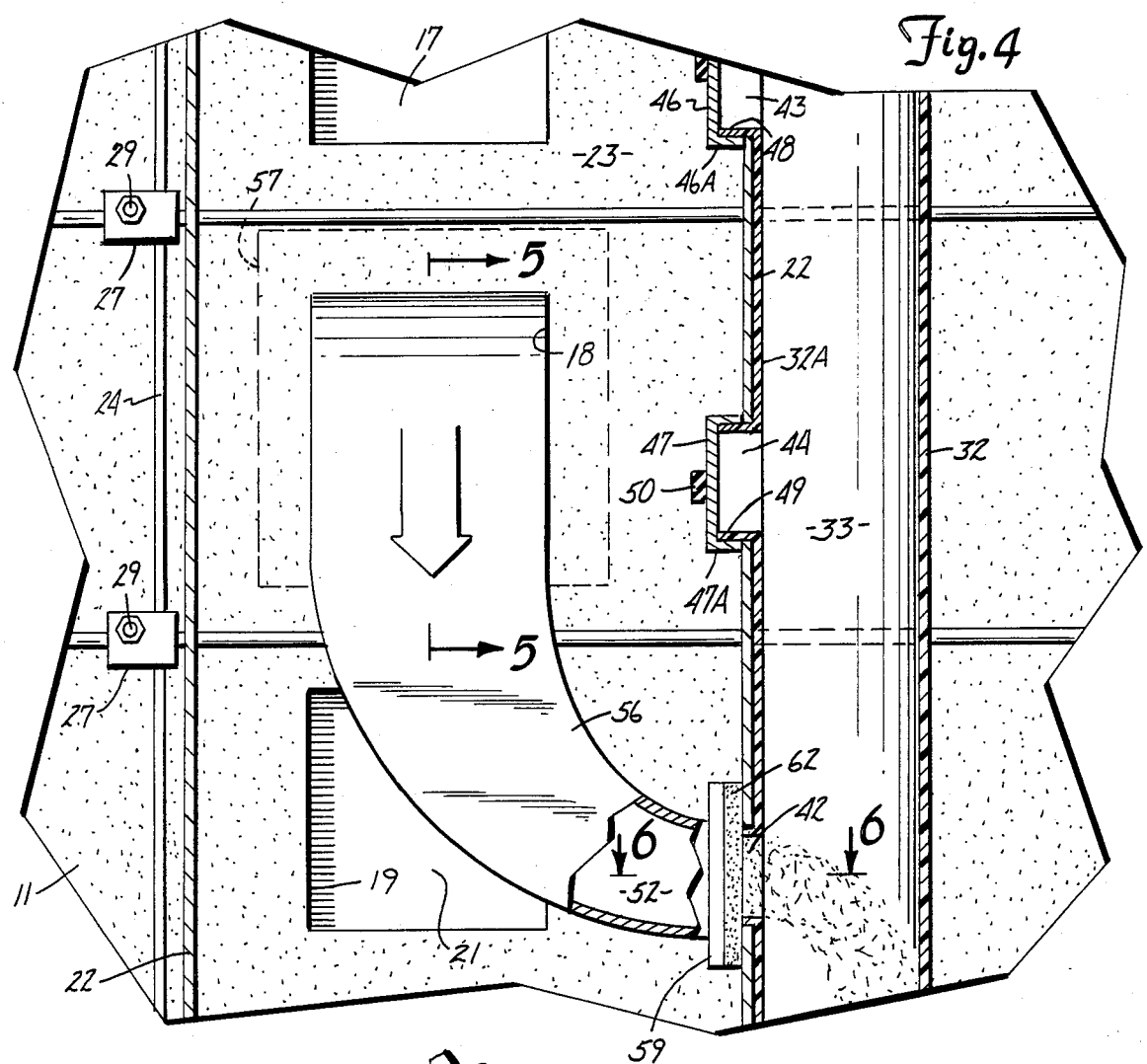
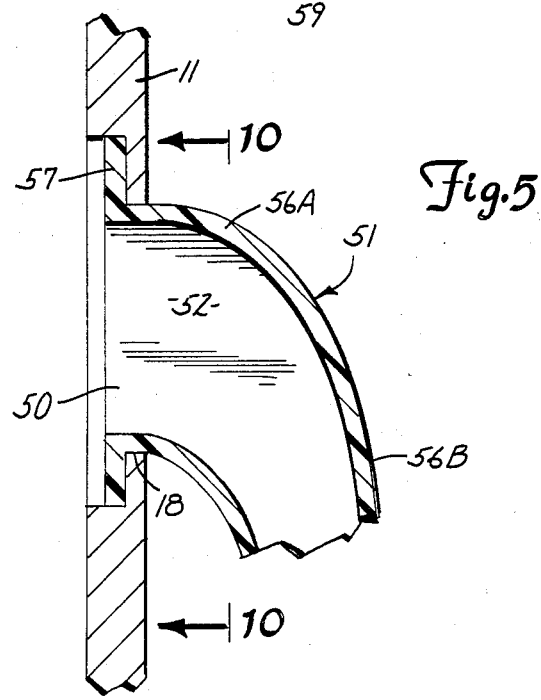

MATERIAL TRANSFER APPARATUS

FIELD OF INVENTION

The invention relates to a tower silo for storing agricultural crops. A tower silo has an upright chute providing a passageway for carrying material discharged from the silo to the base of the silo. Diverter structures located in the passageway direct the material into a separate chute used to carry the material to the base of the silo.

BACKGROUND OF INVENTION

Tower silos are used to store corn silage, haylage and like agricultural roughage feeds. These silos have upright cylindrical walls provided with vertically spaced doorways used to enter the silo and discharge the roughage feeds from the silos. Upright chutes mounted on the silo walls provide passageways for carrying the roughage feeds to the base of the silos. Top unloading silo unloaders operate to collect roughage feed stored in the silos and discharge the feed through an open doorway into the passageway. The feed falls down the passageway to the base of the silo. The inside of the chute and foot supports collect feed. This feed in cold weather freezes making it difficult to climb up the chute to service the unloader.

Separate tubes and walls have been located inside silo chutes to provide a separate passageway for material. Material transfer conduits carry the material from a silo doorway to the separate passageway. Examples of these structures are shown in U.S. Pat. Nos. 3,709,345 and 3,797,625. The tubes and walls being located within the silo chutes substantially reduce the size of the passageway thereby making it difficult for the operator to climb up and down the silo to service the silo unloader and reposition the transfer conduits.

– SUMMARY OF INVENTION

The invention relates to a material transfer apparatus useable with a conventional tower silo for carrying material from a silo doorway to the base of the silo. The apparatus has material transfer housing means cooperating with chute means for receiving material from the housing means and carrying the material to the base of the silo. The material transfer housing means extend through an open doorway in the silo wall into the passageway provided by the upright enclosure attached to the silo wall. The chute means forms a material passageway leading to the base of the silo. The enclosure has vertical spaced doorways providing access to the material passageway. The doorways are normally closed with removable doors. The material transfer housing means has body means providing a passage that extends from the silo wall to an opening in the enclosure. Material from the inside of the silo is discharged into the passage and flows through the passage into the material carrying passageway.

The preferred embodiment of the material transfer apparatus has material transfer housing means used with a conventional agricultural tower silo to carry roughage feeds, as silage and haylage, to a material carrying passageway located adjacent to the upright enclosure positioned over the silo doorways. An elongated upright chute means attached to the side of the enclosure provides the passageway. The housing means comprises a one-piece tubular member having a general reverse S-curved shape. The inlet end of the tubular member is normally disposed relative to the outlet end whereby the material in the passage formed by the tubular member flows outwardly, downwardly, and laterally relative to the silo doorway accommodating the housing means. The inlet end of the housing means has an outwardly directed continuous first flange adapted to fit into an open silo doorway. The flange mounts the inlet end of the housing means on the silo wall. The outlet end of the housing means has an outwardly directed continuous second flange located adjacent the wall of the enclosure. The wall of the enclosure has vertically spaced openings providing access to the passageway. Inwardly directed lip means secured to the chute means project through each opening. The inner end of the housing means fits on the lip means to align the outlet of the passage with the opening and support the outer end of the housing on the frame means. The lip means fits into a groove provided in the outer end of the housing means to inhibit flow back of material into the enclosure passage. A resilient cushion located between the second flange and enclosure inhibits movement of material between the second flange and enclosure into the space surrounded by the enclosure.

The housing means including the tubular member and first and second flanges is a one-piece unit of rigid material, such as glass fiber reinforced plastic. The inlet and outlet ends of the housing means are mounted on shoulder and lip supports and are retained thereon without separate connectors or fasteners. The housing means is readily handled and positioned in an open silo doorway and on a lip support without the use of tools and a hoist. These and further advantages of the material transfer apparatus are embodied in the following detailed description of the invention.

IN THE DRAWINGS

FIG. 4 is an enlarged sectional view taken along the line 4—4 of FIG. 3;

FIG. 5 is a sectional view taken along the line 5—5 of FIG. 4;

DESCRIPTION OF PREFERRED EMBODIMENT

Figure 1:
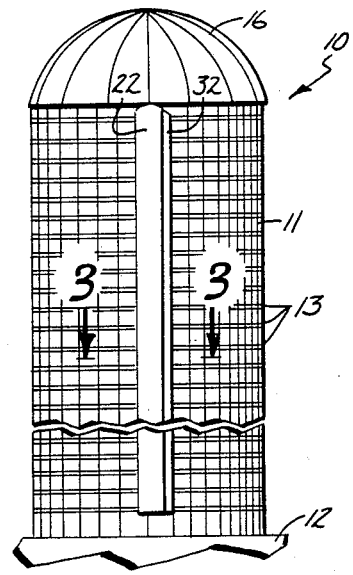
FIG. 1 is a fragmentary elevational view of a tower silo equipped with the material transfer housing and chute of the invention.
Figure 2:
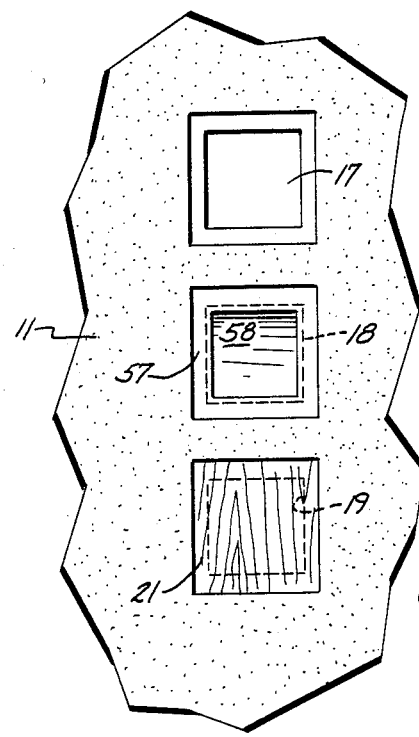
FIG. 2 is a fragmentary elevational view of the inside of the silo showing the vertically aligned doorways with the transfer housing located in one of the doorways.

Referring to FIG. 1, there is shown a tower silo indicated generally at 10 having a cylindrical upright side wall 11 supported on a base 12. Side wall is reinforced with a plurality of vertically spaced rings or hoops 13 and is covered with a dome roof 16. Side wall 11 surrounds chamber 14 used to store roughage feed, such as silage, haylage, and the like. As shown in FIG. 2, side wall 11 has a plurality of vertically spaced doorways 17, 18, and 19 providing access to chamber 14. Side wall 11 has additional doorways (not shown) extended from the base 12 to roof 16. The doorways are normally closed with a door 21. The doors are periodically removed from a doorway and placed in an open doorway as the level of the feed in the silo is lowered.

An upwardly extended enclosure of chute 22 provides a vertical passageway 23 in vertical alignment with doorways 17, 18. and 19. The passageway 23 has a size that allows a workperson to climb to the top of the silo or to an open doorway and enter silo chamber 14. As shown in FIG. 1, enclosure 22 extends from adjacent base 12 to roof 16. Enclosure 22 is a rigid structure, such as sheet metal or plastic, having a generally U-shaped cross section. The inner edges of enclosure 22 have hook-shaped beads 24 and 26 that cooperate with clamps 27 and 28 to mount enclosure 22 on the rings 13. J-bolts 29 and 31 secure brackets 27 and 28 to ring 13.

Figure 3:
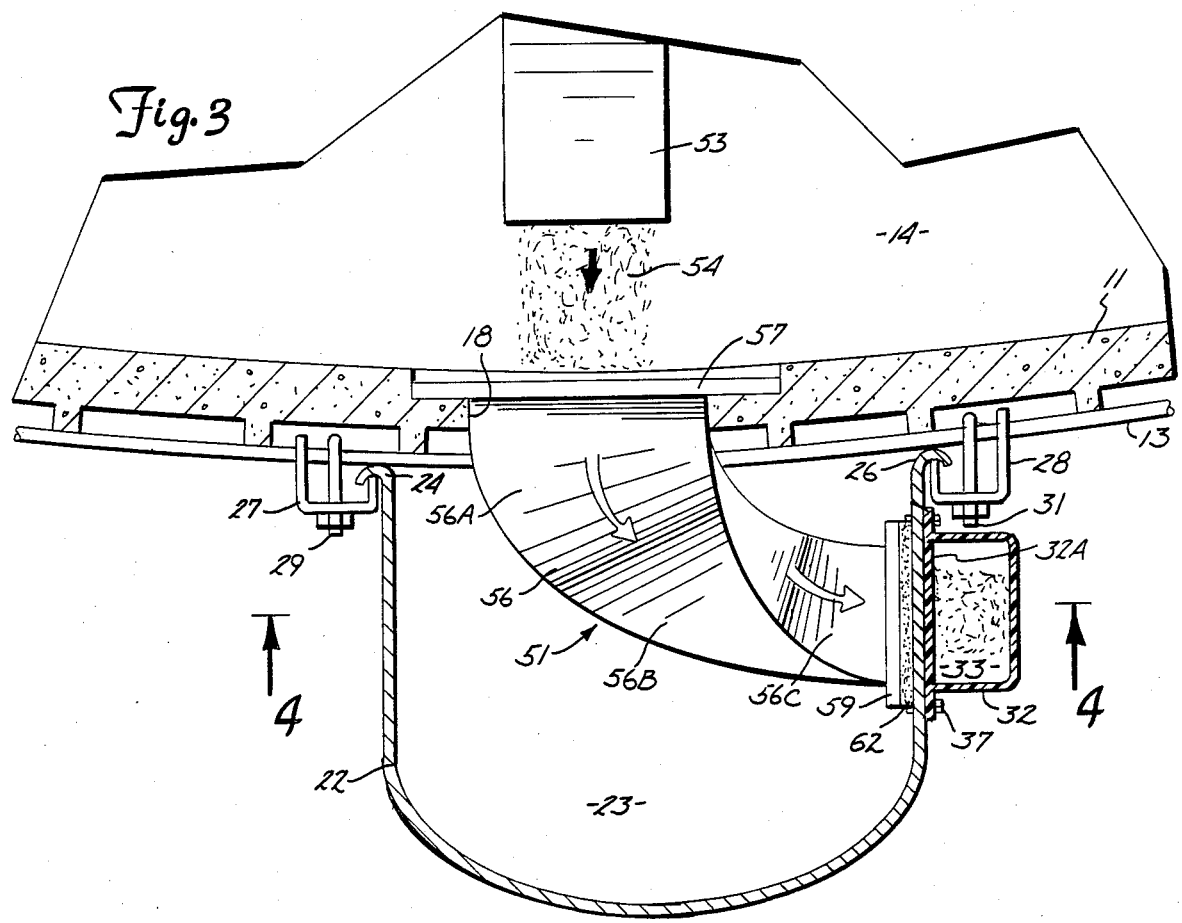
FIG. 3 is an enlarged sectional view taken along the line 3—3 of FIG. 1.
Figure 8:
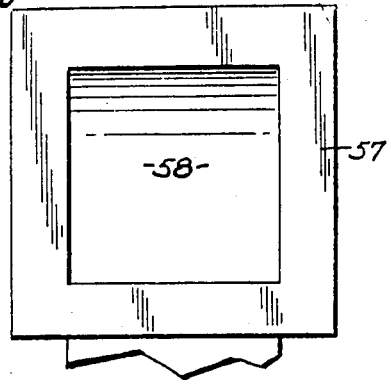
FIG. 8 is an elevational view of the inlet end of the material transfer housing of FIG. 7.
Figure 9:
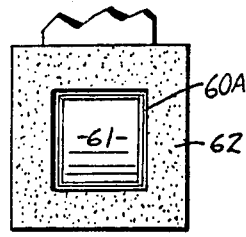
FIG. 9 is an elevational view of the discharge end of the material transfer housing of FIG. 7.
Figure 6:
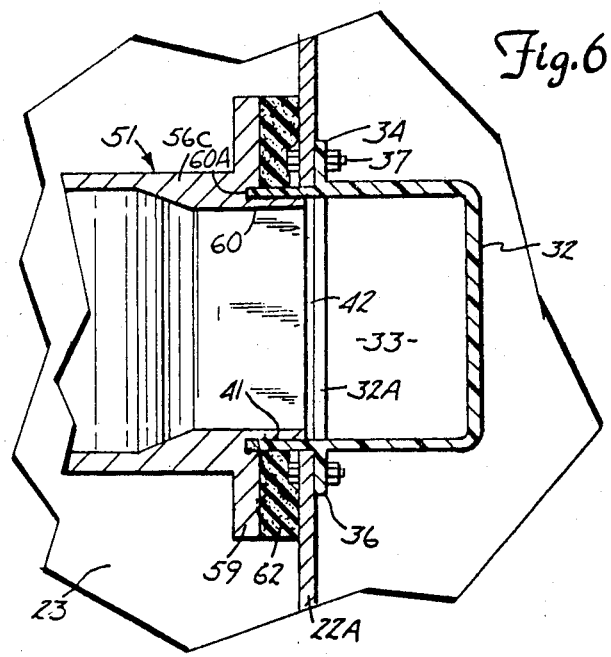
FIG. 6 is a sectional view taken along the line 6—6 of FIG. 4.
Figure 7:
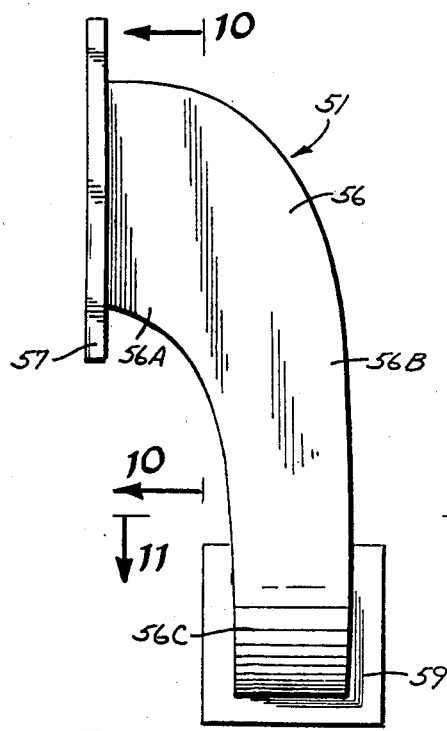
FIG. 7 is a side elevational view of the material transfer housing.
Figure 10:
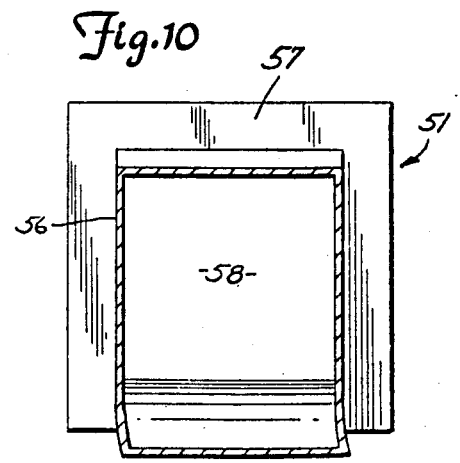
FIG. 10 is a sectional view taken along the line 10—10 of FIG. 7.
Figure 11:
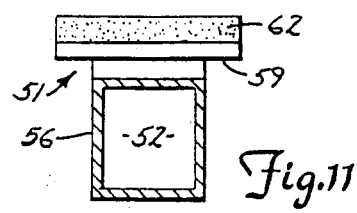
FIG. 11 is a sectional view taken along the line 11—11 of FIG. 7.

As shown in FIG. 3, a side or second chute 32 having a vertical passageway 33 is mounted on the side of enclosure 22. Chute 32 is a generally rectangular sheet member of rigid material such as plastic, extended from the top to the bottom of the silo. Preferably, chute 32 is an elongated plastic tubular member. As shown in FIGS. 4 and 6, chute 32 has a plurality of inwardly directed lips 41, 48, and 49 projected through holes 42, 43, and 44 in enclosure 22. As shown in FIG. 6, lip 41 has a rectangular outline and provides support for the outlet end of housing 51. Outwardly directed flanges 34 and 36 secured to lip 41 is connected to enclosure 22 with bolts 37. The inside wall 32A of chute 32 is located in engagement with the outside of enclosure 22. The material moving down chute passage 33 does not contact the enclosure 22 as it is protected by inside wall 32A. This prevents rust and corrosion of the metal of enclosure 22. Chute 32 can be separated from enclosure 22 and mounted directly on silo wall 11.

Referring to FIG. 6, a generally rectangular lip 41 is located on the inside of side wall 22A. Lip 41 has lateral flanges 34 and 36 accommodating bolts 37 which clamp and chute 32 to side wall 22A. Lip 41 provides a generally rectangular support surrounding opening 42. As shown in FIG. 4, enclosure 22 has additional vertical spaced openings 43 and 44 normally closed with removable covers 46 and 47. The vertically spaced openings in side walls 22A extend the entire length of enclosure 22 to provide access openings into chute passageway 33. Covers 46 and 47 are generally flat pan-shaped members having outer peripheral flanges 46A and 47A that releasably mounted on the frames surrounding openings 43 and 44. Holding members 50, such as elastic strips, retain covers 46 and 47 on lips 48 and 49. Lips 48 and 49 are identical to lip 41 and are attached to enclosure 22 with bolts used to secure the chute 32 to the outside of enclosure 22.

As shown in FIGS. 3 and 4, a funnel-shaped housing indicated generally at 51 having a downwardly and laterally curved or two dimensional reverse S-curved passage 52 carries the material from the inside of the silo into chute passageway 33. A conventional silo unloader (not shown) delivers the material downwardly and laterally into chute passageway 33. Examples of top unloading silo unloaders as shown by Buschbom in U.S. Pat. Nos. 3,221,904 and 4,170,385. Other types of top loading silo unloaders can be used to discharge silage into housing 51, as shown in FIG. 3.

Housing 51 has a reverse S-shaped body 56 having a first or inlet section 56A joined to a mid-section 56B and an outlet or end section 56C. An outwardly directed continuous first flange 57 is joined to the inlet end of section 56A and surrounds an inlet opening 58 open to passage 52. As shown in FIGS. 3 and 5, flange 57 projects laterally from the inlet end of a body section 56A. Flange 57 fits over the stepped portion of the silo wall 11 providing doorway 18. Flange 57 supports the inner end of housing 51 on silo wall 11 and aligns the inlet of passage 52 with the doorway for receiving material 54 form the outchute 53 of the silo unloader. Flange 57 can be larger than doorway 18 and engage the inside of silo wall 11. Inlet section 56A can extend inwardly toward the outchute 53 of the silo unloader to shorten the space between the end of outchute 53 and inlet opening 58. A flexible tubular member can be attached to the discharge end of the silo unloader outchute 53 to carry material into housing 51.

Section 56A extends outwardly and curves downwardly and is joined to a downwardly directed mid-section 56B. The mid-section 56B is joined to laterally curved outlet section 56C. The body has a generally rectangular cross section between its ends which reduces in size from the inlet to the outlet ends thereof. A second outwardly directed continuous flange 59 is secured to the discharge end of outlet section 56C. The outer end of body 56 has an inside wall section or flange 60 projected through the opening surrounded by lip 41 and opening 42. Wall section 60 has a smooth inside surface that directs the material flowing in passage 52 directly into chute passageway 33. Flange 60 is spaced inwardly from flange 59 and forms therewith a groove 60A. Lip 41 fits into groove 60A to mount housing 51 on chute 32. Lip 41, flange 60, and groove 60A inhibits flow back of material into enclosure passageway 23.

The body 56 and flanges 57, 59, and 60, are a one-piece structure of rigid material, such as glass fiber reinforced plastic. The inside of body 56 is smooth to minimize collection of material on the body. Other types of materials can be used to make body 56 and flanges 57 and 59.

A generally rectangular cushion 62 of compressible resilient material, such as foam rubber, foam plastic, and the like, is secured to the outer face of second flange 59. The cushion 62 serves as a seal between second flange 59 and the inside of enclosure 22 to inhibit flow of material into main chute passageway 23. Cushion 62 being compressible further provides clearance and tolerances for variations in silo doorways and enclosure side walls.

In use, housing 51 is extended through an opening, such as doorway 18, into passageway 23. The outlet section 56C of housing 51 extends laterally to lip 41. As shown in FIG. 6, a peripheral portion 63 of the inside of body section 56C rests on lip 41. Cushion 63 is compressed against the enclosure 22 providing an air seal between flange 59 and enclosure 22. Connectors and fasteners are not used to secure the housing 51 to the silo wall 11 or the enclosure 22. Nuts and bolts, screws and the like are eliminated so that these parts cannot contaminate the animal food. This controls hardware disease in animals that eat roughage feed. The weight of the housing 51 retains flange 57 in doorway 18 and flange 59 around lip 41. The housing is relocated to a lower doorway, when the level of the feed is lowered and the unloader discharge chute is lowered. The housing is placed in a lower open doorway to receive feed from the silo unloader.

There has been shown and described one embodiment of the material transfer apparatus. It is understood that changes in the housing and chute may be made by one skilled in the art without departing from the invention. The invention is defined in the following claims.

The embodiments of the invention in which an exclusive property or privilege is claimed are defined as follows:

1. Apparatus for use with a tower silo having an upright silo wall supported on a base and surrounding a chamber for storing material, said wall having vertically disposed doorways allowing material in the silo to be discharged from the silo comprising: first means having a side wall secured to the upright silo wall, said side wall being located adjacent said doorways and extended in a generally upright direction, chute means having an upright chute passage secured to said side wall for carrying material toward the base of the silo, said side wall having a plurality of vertically disposed openings open to said chute passage, said chute means having a plurality of lip means extended through said openings in the side wall, each of said lip means comprising a continuous lip surrounding an opening through the side wall, door means mounted on the lip means for closing said openings, housing means having a passage for carrying material discharged toward a doorway to said chute passage, said housing means having an inlet end located adjacent a doorway an outlet end open to one of said openings, said housing means including body means having a body passage in communication with said inlet and outlet ends for carrying material to said chute passage, said body passage curved downwardly from the inlet end and laterally toward the outlet end of the housing means, said body means including continuous outwardly directed first flange means secured to said body means around the inlet end of the housing means, said first flange means being adapted to be located in the doorway in the silo wall, said body means having outlet end means mounted on said lip to support the outlet end of the housing means on said lip, said outlet end means having a continuous outwardly directed second flange means secured to the body means around the outlet end thereof, and third flange means extended in the direction of the lip means, said third flange means being mounted on said lip to support the outer end of the housing on said lip and resilient means surrounding said third flange means and engageable with said second flange means and said chute means to close the space between the second flange means and side wall.

2. The apparatus of claim 1 wherein:
said chute means is an elongated tubular member having said lip means, and mean securing the lip means to said side wall.

3. The apparatus of claim 1 wherein:
said side wall is part of an elongated upright enclosure located adjacent the outside of said doorways providing a passage accommodating said housing means.

4. The apparatus of claim 1 wherein:
said resilient means is a generally rectangular cushion.

5. The apparatus of claim 1 wherein:
said silo wall includes recesses surrounding each doorway, said first flange means adapted to be located in a recess whereby the inlet end of the housing means is supported on the silo wall.

6. The apparatus of claim 1 wherein:
said body means is a one-piece tubular member having a reverse S-curved shape with an inlet end section and outlet end section, said outlet section being normally disposed relative to the inlet section, said outlet section having a groove accommodating said lip.

7. Apparatus for use with a tower silo having an upright silo wall surrounding a material storing chamber, said wall having vertically disposed doorways allowing material in the silo to be discharged into an upright passage formed by an enclosure secured to the silo wall comprising: chute means having an upright chute passage, openings in said enclosure open to said chute passage, said chute means having a plurality of lips projected through said openings providing passageways into the chute passage, housing means having a passage for carrying material discharged toward a doorway to said chute passage, said housing means having an inlet end located through a doorway, an outlet end open to one of said passageway, said housing means including body means having a body passage in communication with said inlet and outlet ends for carrying material to said chute passage, said body means being a one-piece tubular body having a reverse S-curved shape with an inlet end section and an outlet end section, said outlet end section being normally disposed relative to the inlet end section, said outlet end section having means mounted on one of said lips to support the outlet end of the housing means on said one of said lips, said means mounted on one of said lips comprising a continuous flange telescoped into said lips and a radial flange surrounding said telescoping flange, and seal means adjacent said radial flange for sealing the passage between the radial flange and the enclosure.

8. The apparatus of claim 7 wherein:
said chute means is an elongated tubular member and means securing the tubular member to said enclosure.

9. The apparatus of claim 7 wherein:
said housing means includes continuous outwardly directed flange means secured to said body means around the inlet end of the housing means.

10. The apparatus of claim 7 wherein:
said resilient means is a generally rectangular cushion.

11. The apparatus of claim 7 wherein: said housing means includes a continuous outwardly directed first flange means secured to the body means around the inlet end of the housing means, said first flange means adapted to be located in a doorway in the silo wall, a continuous outwardly directed second flange means secured to said body means around the outlet end of the housing means, said second flange means surrounding said one of said lips, groove means in said outlet end accommodating said one of said lips and third flange means telescoped into the passageway of said one of said lips whereby the outlet end of the housing means is supported on one of said lips.

12. The apparatus of claim 11 wherein:
said silo wall includes recesses surrounding each doorway, said first flange means adapted to be located adjacent a recess whereby the inlet end of the housing means is supported on the silo wall.

13. A housing for directing material into a passageway comprising: body means having a body passage, and inlet and outlet ends open to the body passage, said body means comprising a one-piece tubular member having a reverse S-curved shape with an inlet end section and an outlet end section, said outlet end section being normally disposed relative to the inlet end section, first flange means secured to and projected outwardly from said inlet end section, and second flange means secured to and projected outwardly from the outlet end section, a third flange on the outlet end section projected in the direction of said outlet end section, and a cushion of compressible material secured to the outer face of the second flange surrounding the third flange.

14. The housing of claim 13 wherein:
said body means extends downwardly and laterally from the inlet end section thereof.

15. The housing of claim 13 wherein:
the inlet end of the body has a generally rectangular shape, said first flange means being a continuous flange extended around the inlet end section of the body means.

16. The housing of claim 13 wherein: the outlet end section has recess means located around said third flange means for accommodating a support having an opening for receiving material moving through said body passage.

17. The housing of claim 13 wherein:
said second flange means is a continuous flange surrounding the outlet end section.

18. The housing of claim 13 wherein:
the outlet end section has groove means for accommodating a lip surrounding an opening for receiving material moving through said body passage.

* * * * *